United States Patent [19]

Hume, III

[11] Patent Number: 4,536,012

[45] Date of Patent: Aug. 20, 1985

[54] BOOK BINDING PROCESS

[75] Inventor: Robert M. Hume, III, Cottage Grove, Minn.

[73] Assignee: H. B. Fuller Company, St. Paul, Minn.

[21] Appl. No.: 610,350

[22] Filed: May 15, 1984

[51] Int. Cl.³ .......................... B42D 1/00; B05D 5/10
[52] U.S. Cl. ..................................... 281/21 R; 412/8;
 427/208.2; 427/262; 427/285
[58] Field of Search ............ 427/285, 267, 262, 208.2;
 412/8, 37; 281/21 R

[56] References Cited

U.S. PATENT DOCUMENTS 4,116,740 9/1978 Musselman et al. ................. 156/205
4,377,649 3/1983 Sweeney et al. ....................... 524/69

FOREIGN PATENT DOCUMENTS 57-198771 12/1982 Japan ..................................... 412/8

OTHER PUBLICATIONS

Technical Bulletin—Dow Latex 620, The Dow Chemical Co., 1966.
Japanese Patent Kokai 14,818/78 (2/9/78) (Abstract).
Japanese Patent Kokai 64,116/79 (5/23/79) (Abstract).
Japanese Patent Kokai 59,923/82 (4/10/82) (Abstract).
European Patent 13—031, Pub. 7/9/80 (Abstract).
Chem. Abstr. 90, 170,440u (1979) (Abstract of Japanese Patent Kokai 126,308/79).
"Why National Starch Dropped R&D in Hot Melt Corrugating," Paperboard Packaging (Nov. 1974) at pp. 54–55.

Primary Examiner—Evan K. Lawrence
Attorney, Agent, or Firm—Merchant, Gould, Smith, Edell, Welter & Schmidt

[57] ABSTRACT

A continuous book binding process and a book comprising a backbone made by the process. The process comprises forming a book block, applying a wet coating of a primer composition to the spine area of the block, thermally drying said coating to remove a substantial amount of water to provide a flexible film having a uniformly irregular surface, and applying a coating of a hotmelt adhesive over the film, wherein the primer composition comprises an adhesive latex and an amount of ungelatinized granular starch effective to complex the latex water so that it is evaporated in a diffuse manner during the drying step. The layer of hot melt adhesive is not disturbed by the evaporation of residual water from the primer film.

14 Claims, 3 Drawing Figures

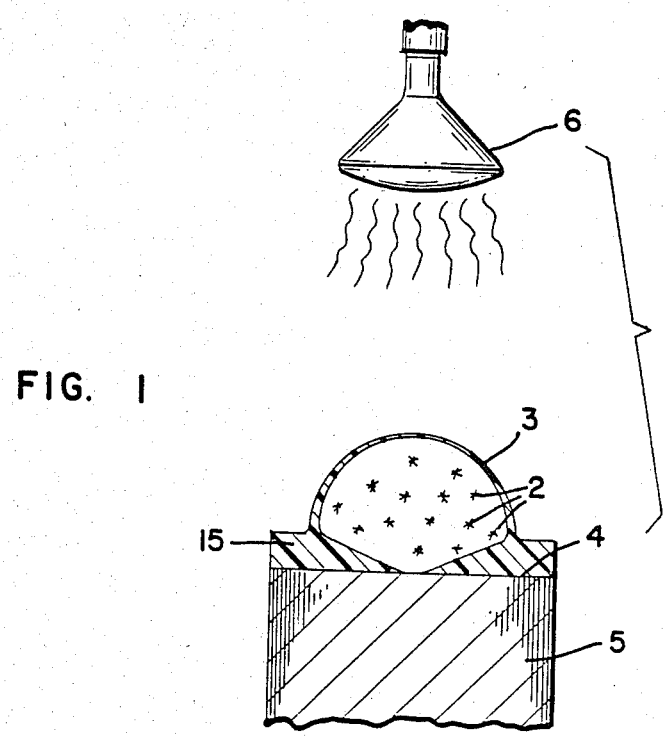
FIG. 1
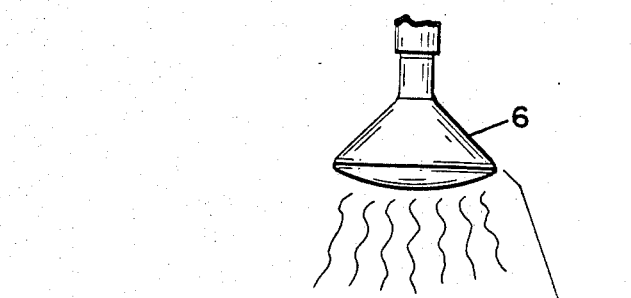
FIG. 2
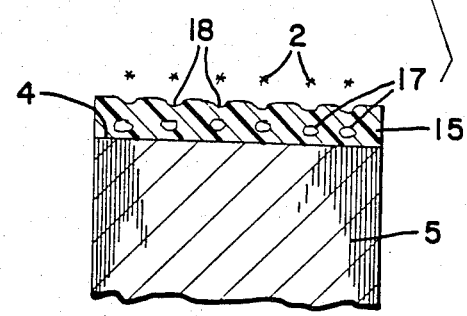

BOOK BINDING PROCESS

FIELD OF THE INVENTION

The present invention relates to an improved book binding process comprising the use of a hinge-primer adhesive composition which can be rapidly dried without blistering or charring. The dried adhesive provides a suitable substrate for the application of the adhesive layer which binds the cover stock to the finished book.

BACKGROUND OF THE INVENTION

The automation of book binding has allowed book production to proceed as an essentially continuous process from the printing and compilation of the pages into book blocks, through the gluing of the block spines, to the application of the cover stock and trimming. In the gluing step, a water-based primer composition comprising a polymeric adhesive is applied to the spine area of the book blocks, which may be in the form of pre-glued or sewn individual signatures. The coating of wet glue is next dried and set to form a flexible film by exposure of the coating to an intense, high temperature heat source. At least one coating of a covering adhesive is then applied over the primer layer to provide the backbone, the cover is adhered to the backbone and the bound pages are trimmed.

The maximum speed at which the adhesive-application steps could be accomplished has been limited by the time needed to dry and set the water-based primer prior to application of the covering adhesive layer, which may be a hot-melt type adhesive. If the primer coating is not sufficiently dried, application of a hot-melt adhesive can cause splattering and blistering of the aqueous primer adhesive. On the other hand, the exposure of the water-based primer layer to the extreme temperature gradients required for high speed drying often causes substantial problems. Conventional primers skin over when exposed to intense heat sources; the wet coating becomes surfaced with a thin polymeric membrane. The water entrained in the interior of the primer layer vaporizes and lifts this dried membrane into large blisters which break and burn as they approach the heat source. If the subsequently-applied adhesive fails to adhere fully to these blistered or burned primer layers, the binding process cannot be completed satisfactorily. The damaged, partially-bound books tend to jam in the assembly line and must be removed and discarded, resulting in substantial economic losses.

Therefore a need exists for improved water-based primer adhesives which resist blistering and charring when exposed to high drying temperatures.

SUMMARY OF THE INVENTION

The present invention provides a process utilizing new water-based primer compositions comprising an amount of ungelatinized starch granules effective to complex a major portion of the water in said primer compositions during the drying process. As the temperature of the wet primer coating rises, the starch swells by absorbing the water. The primer adhesive coating coalesces into a uniform plastic film. While we do not wish to be bound by any theory of action of the primer adhesive system, we believe that the bound water is uniformly and relatively slowly released from the swollen starch granules in a diffuse manner. This controlled water release allows the resultant film to resist blister growth and subsequent charring. Rather, a multiplicity of much smaller bubbles form and burst, cratering the surface of the primer film. The coating thus dries into a uniform, resilient layer which possesses a surface ideal for the application of further adhesive coatings. When a layer of hot-melt adhesive is applied over the primer coating, the layer is not disturbed by evaporation of residual water not removed during the drying.

The present invention also provides a book comprising a backbone formed by the present process.

DETAILED DESCRIPTION OF THE INVENTION

The Binding Process

Figure 3:
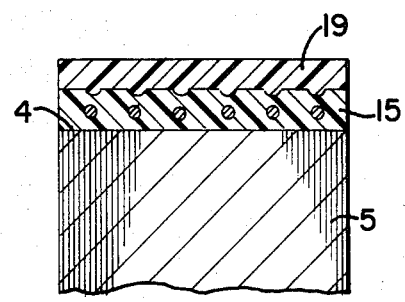

Modern book binding involves a series of collating, gluing and trimming steps which are preferably carried out as a continuous process. Typically, individual pages or signature folds are collated into a compressed stack, or "block". The block may be sewn prior to further processing. Prior to application of the primer adhesive, the outer surface of the spine area can be roughened by a rotating blade to yield an absorptive, planar surface. The block is next provided with a flexible film by the application of a primer, which is preferably a high viscosity latex comprising an emulsified polymeric adhesive resin. The primer is applied in one or more applications so as to coat and penetrate the roughened spine by brushing, rolling or a similar process. A portion of the wet primer wicks between the sheets to form a matrix which when dried, binds the sheets into the body of the flexible film which forms a part of the spine of the block.

After application, the coating of primer is exposed to heat. A substantial amount of the water present in the latex is evaporated and a resilient plastic film forms which is subsequently coated with one or more adhesive layers, which may include a hot-melt adhesive layer. The coverstock is next adhered and the books are trimmed.

Primer Compositions

Latexes

The present primer compositions are modified adhesive latexes. The major portion of the latex solids are emulsified particles of adhesive polymeric resins. Any suitable water-dispersible polymeric resin may be employed as the polymeric solid phase, including, but not limited to polychloroprene (neoprene), styrene-butadiene rubber, vinyl-vinylidene chloride, ethylene-vinyl chloride copolymers, ethylene-vinyl acetate copolymers, vinyl acetate-acrylic acid copolymers and acrylonitrite-butadiene copolymers. Preferred polymeric latex adhesive bases include the alkali-soluble vinyl acetate-acrylic acid copolymer available as a 55% aqueous emulsion as Covinax ®106 from the Franklin Chemical Co., Columbus, OH and Dow ®620 styrene-butadiene latex (Dow Chemical Co.). Especially referred latex adhesives include the 15% ethylene-85% vinyl acetate copolymer available as a 55% aqueous dispersion as Airflex ®400 (Air Products Corp.) or the ethylene-vinyl acetate copolymer available as Elvace ®1875 from Riechhold Chemical.

Primer compositions are commonly prepared by dosing such latexes with minor but effective amounts of surfactants, biocides, foam-control agents and plasticizer, and by adding water, if necessary, to bring the solids content into the desired range.

Starch

The highly-desirable properties exhibited by the present primer compositions are achieved by the incorporation therein of an amount of ungelatinized (nonswollen) starch granules efective to complex or absorb a major portion, preferably substantially all of the water in the primer composition during the drying process. It is believed that this complexation causes the adhesive particles dispersed in the primer coating to coalesce, forming a uniform, resilient film which does not skin over. The water-swollen starch granules effectively create a moisture reservoir which helps the primer to resist blistering and charring by releasing the water diffusely from the primer film as the drying temperature increases. The water passes through small pores in the primer film surface at a controlled rate that prevents blister formation.

Starch is a high molecular weight carbohydrate of the general formula $(C_6H_{10}O_5)_n$. Starch granules exhibit a structure of concentric sheets which contain an elutable amylose fraction in the inner layers and an amylopectin fraction in the outer layers. When starch granules are contacted with water and heated above a temperature designated the gel point, the granules begin to bind water and swell. The gel temperature for a particular starch variety depends on a number of factors, including particle size, pH and absolute concentration. If the weight ratio of starch to water is high enough, the effect of exceeding the gel temperature will be to gel substantially all of the water into a thick paste.

Starches useful in the present primer compositions will be chosen from any of those which can be mixed with the base primer composition at a concentration effective to complex a major portion of the free water present during the drying process, while not overly increasing the viscosity of the primer compositions prior to the drying step.

Useful starches may be selected from any of a wide variety of commercially-available products including but not limited to corn, potato, wheat, rice, waxy maize, sago, sorghum, arrowroot, tapioca or mixtures thereof. These raw starches typically have granules sized within the range of about 2-150 microns, as measured along the longest axis, and exhibit gel temperatures of about 55°-80° C. Since these starches can bind about 600-1000% of their weight of water, for most binding applications useful amounts of the starch additive will fall within the range of about 1-20%, preferably about 2-15% and most preferably about 3-10% of the total wet weight of the primer composition. Although it is preferred to add an amount of starch within these ranges which will complex a major portion of the water in the composition, amounts of starch effective to absorb 50% or less of the composition water have been found to enhance the drying characteristics of the present primers, although to a lesser extent.

Surfactants

Although the commercially-available latexes useful as starting materials for primers often comprise minor amounts of dispersing agents for the polymeric adhesive particles therein, it is often desirable to add additional amounts of surfactants to enhance the ability of the polymeric dispersion to wet the paper fibers and help to maintain the starch additive in suspension. The added surfactants can be anionic, cationic, nonionic or amphoteric and should be selected to be compatible with the surfactants already present in the latex, if any.

Examples of useful nonionic surfactants include polyethylenoxy esters and ethers of alkylphenols, alkanols and mercaptans, as well as polyethylenoxy compounds with amide links. One useful class of nonionic surfactants is the Tergitol® series, available from Union Carbide, which are formed by condensing about 3-10 moles of ethylene oxide with a $C_{12}$-$C_{15}$ alkanol.

Examples of anionic surfactants include (a) carboxylic acids such as soaps of straight-chain naturally-occurring fatty acids, chain-substituted derivatives of fatty acids, branched-chain and odd-carbon fatty acids, acids derived from paraffin oxidation, and carboxylic acids with intermediate linkages; and (b) sulfuric esters such as sodium lauryl sulfate, tallow alcohol sulfates and coconut alcohol sulfates.

Examples of cationic surfactants include nonquaternary nitrogen bases such as amines without intermediate linkages, and quaternary nitrogen bases. The quaternary nitrogen bases are preferably those which also function as biocides, since such "quats" act to inhibit the growth of microorganisms which would attack the bindings of the finished books. Especially preferred quaternary ammonium surfactants are the $C_8$-$C_{20}$-alkyl(dimethyl)-(benzyl or substituted-benzyl)ammonium halides such as benzalkonium chloride, cetalkonium chloride, methylbenzethonium chloride, cetyl(dimethyl)ethyl ammonium bromide, domiphen bromide, gentian violet, dicoco(dimethyl)ammonium chloride, cetyl(trimethyl)ammonium bromine and the like.

Biocides

Apart from the antimicrobial action imparted to the latex adhesive by any added surfactants, it is often desirable to add an effective amount of one or more additional biocides, particularly in cases where a quat surfactant cannot be employed. Such agents include chlorhexidine gluconate, glutaral, hexachlorophene, nitrofurazone, nitromersol, thimerosol, $C_1$-$C_5$-parabens, chlorophene, phenolics, mefanide acetate, aminacrine hydrochloride, oxychlorosene, metabromsalene, merbromine and dibromsalan. Preferred biocides include formaldehyde (formalin), cresols, sodium ortho-phenyl phenol (Dowicide® A, Dow Chemical Co.) and 2,2'-methylene-bis-(4-chlorophenol), which is available as Cuniphen®2778 from Ventron Corporation, Beverly, MA.

Plasticizer

The present primer compositions preferably will include an amount of plasticizer effective to maintain the polymer particles in a flexible state, thus maintaining the resiliency of the dried, set primer adhesive. Useful plasticizers may be selected from any of the commercially-available benzoates, hydroxylated benzoates or hydroxylated benzyl esters of alkanols. One useful plasticizer is the mixed dibenzoate of dipropylene glycol and diethylene glycol, available from Velsicol Corp., Chicago, IL as Benzoflex®50. Another useful plasticizer is butyl benzyl phthalate available from Monsanto Co. as Santicizer®160.

Foam Control Agents

In addition to the plasticizer and biocide, the primer compositions preferably contain one or more foam control agents in an amount effective to substantially prevent the primer adhesive from foaming when it is applied to the roughened spine area, e.g., by rotating brushes. Any agent useful to control the surfactant-induced foaming of aqueous emulsions may be employed in the present primers, including but not limited to polysiloxanes such as simethicone, dimethicone copolyol, cyclomethicones and the like. Other useful foam-control agents are the proprietary Nopco® defoamers available from Nopco Chemical Division, Newark, NJ and Colloid ®711, available from Colloids, Inc., Newark, NJ.

The present primer compositions may also include a minor amount of a basic metal salt, e.g. sodium or potassium hydroxide, effective to lower the gel temperature of the starch employed. The use of such salts is indicated when a starch which swells at relatively high temperatures, e.g. rice starch, is employed in primer compositions which are exposed to extreme temperature fluxes during drying. From about 0–5% of the salt can preferably be employed in the present compositions.

Thus, the primer compositions of the present invention will comprise about 50–97%, preferably about 75–95% of an adhesive latex; about 3–10% starch; about 0.05–5%, preferably about 0.1–1% of a biocide, about 0.05–2%, preferably about 0.07–1% of foam control agent, and about 1–10%, preferably about 2–7% plasticizer. Optionally, the primers can comprise about 0.02–5%, preferably about 0.05–2.5% of added surfactant and about 0.1–1% of an alkali metal hydroxide salt. The starch-containing primers will comprise about 30–80% total solids, preferably about 45–65% total solids and most preferably about 55–63% total solids.

Preparation

The present adhesive primer compositions can be prepared by dispersing the starch and other adjuvants in the latex component in any convenient manner. Typically an appropriate liquid mixer is charged with the latex, followed by addition of the plasticizer with stirring. After the polymeric granules have been adequately plasticized, e.g. after about 0.25–0.75 hours of stirring at 20°–30° C., defoamer is added, followed by the surfactants, if any, and the biocide. Slow stirring is continued until the mixture is homogeneous and then the powdered starch is gradually added. After about 0.25–0.75 hours of slow mixing, water is added, if necessary, to adjust the viscosity and bring the total percent solids into the desired range. After screening the slurry to remove any agglomerated material, the composition is ready for use.

Primer Application

The finished starch-containing adhesives are applied to the spine area of the book block, for example by moving the block over a rotating brush or wheel, to a thickness of about 2–35 mils (50–875 microns), preferably about 5–30 mils (125–750 microns). The wet primer is then heated and dried by exposure to thermal radiation provided, for example, by IR lamps, radiant heaters, burners, radio frequency driers or combinations thereof. The drying temperature and total exposure time selected must be balanced so as to adequately dry and set the primer, while not damaging the flexible layer which results or the book pages, e.g. by yellowing, charring or burning.

Conventionally, primer-coated page blocks are dried by moving them through one or more ovens rated at about 1000 or more BTU/in²/sec. and heated to about 65°–125° C. (150°–260° F.), at speeds adjusted so that the primer coat is adequately dried. Use of the present primers permits the exposure of the wet primer to substantially higher drying temperatures, i.e. up to about 150°–200° C. (300°–400 ® F.) without blistering, breaking or charring the primer coat. The increased drying rate which results from the use of such elevated temperatures permits a concomitant decrease in the total exposure time necessary to set the primary, thus permitting the absolute speed of the binding process to be increased.

During the drying process, the primer coating decreases in thickness as its water content is reduced, to yield a strong, flexible, plastic film of about 1–10 mils (25–250 microns) in thickness. The surface of the dried primer is uniformly roughened due to the diffuse escape of water vapor, which inhibits blistering and which pits the film with a multiplicity of small craters. This irregularly textured surface also enhances the adherence of the subsequently applied adhesive layer.

FIG. 1 is a schematic, cross-sectional view illustrative of the blistering which is observed when conventional latex-based primer adhesive layers are exposed to intense thermal gradients. The sudden vaporization of the primer water (2), lifts the elastic coating membrane (3) away from the spine (4) of the book block (5), breaking it and causing charring or burning due to the close approach of the raised membrane to the heat source (6).

FIG. 2 is a schematic cross-sectional view illustrative of the surface texturing effect observed when a coating of a primer of the present invention is dried. Exposure of coating (15) to heat source (16), raises the coating temperature, causing the dispersed starch granules (17) to bind water and swell. As the temperature of the coalesced coating continues to rise, the bound water is released from the granules and exits the coating in a diffuse manner as indicated by droplets (2), forming dispersed craters, pores or pits (18) in the coating.

FIG. 3 is a schematic cross-sectional view illustrative of a layer of covering adhesive (19) which is applied to the dried coating (15) of the primer adhesive of the present invention.

HOT MELT ADHESIVE

The dried primer layer is next coated with a layer of a covering adhesive such as a hot-melt adhesive, which, when cooled, yields a tacky coating which functions to adhere the cover stock to the backbone of the book. Typically, the hot-melt adhesive will be applied to the coating as a liquid heated to about 300°–400° F. (150°–200° C.). The coverstock is then applied to cover the individual page blocks and the books are trimmed. In a continuously binding operation, the hot-melt is applied to the individual book blocks by passing them over a heated reservoir of the adhesive which is fed onto a rotating wheel and doctored to the necessary thickness.

Hot-melt adhesives employed in a book-binding typically comprise combinations of a polymeric component with a tackifying wax or resin and, optionally, an oil and a minor amount of resinous or monomeric plasticizer.

Substances useful as the polymeric component of hot-melt adhesives include ethylene-vinyl acetate copolymers, block copolymers of styrene with isoprene, butadiene or ethylene-butylene midblocks, polyamides, polyisobutylene, polyacrylates or polyesters. Of these polymers, ethylene-vinyl acetate copolymers are preferred, due to their compatibility with the preferred ethylene-vinyl acetate latexes used to form the primers. The tackifiers commonly used in hot-melt adhesive formulations includes rosins, rosin-resin esters, polyterpenes, terpene phenolics, aliphatic and aromatic hydrocarbons, asphalt and the like. Hot-melt adhesives of this type are commercially available as the HM series from H. B. Fuller Co., St. Paul, MN, i.e. HM-1922, HM-1330, HM-1832 and HM-3415.

A further advantage is realized from the use of the starch-containing primer compositions in conjunction with hot-melt adhesives of this type, apart from the controlled roughening achieved when the wet primer is dried. Problems often result when high temperature coatings of hot-melts are applied over water-based primers due to the vaporization of the residual water, which can cause dangerous splattering of the hot-melt and loss of the integrity of the layer. Even when contacted with hot-melts at temperatures in excess of 300° F., the dried primer compositions of the present invention do not release water in amounts sufficient to disturb the hot-melt layer, which cools and tackifies to yield a coherent film.

The invention will be further described by reference to the following detailed examples.

EXAMPLE I

PRIMER COMPOSITION

A vertical kettle mixer was charged with 360 g of a 15% ethylene-85% vinyl acetate copolymer latex, 55% solids, (Airflex ®400 latex) and 32 g of cornstarch was slowly added at 25° C. with stirring, followed by 2.0 g of 37% formaldehyde, 0.8 g of Nopco ® VF defoamer, 0.80 g Dowicide ® A biocide and 4.4 g water, to yield 400 g of an opague white primer adhesive having a viscosity of 2800 cP (Brookfield viscosimeter, spindle 3, speed 20 at 36° C.) a pH of 5.0 and containing 57.2% solids.

EXAMPLE II

PRIMER COMPOSITION

A vertical kettle mixer was charged with 415 g of Airflex ®400 latex and 15 g of butyl benzyl phthalate (Santicizer ®160) added with stirring. After 30 minutes of stirring at 25° C., 0.5 g of Nopco ® VF defoamer was added, followed by gradual addition of 40 g of corn starch, 0.75 g of 37% formaldehyde, 0.75 g of Dowicide ® A biocide and 28.0 g water. The opaque primer composition exhibited a viscosity of 800 cp (spindle 2, speed 20 at 36° C.), a pH of 5.0 and contained 56.5% solids.

EXAMPLE III

PRIMER COMPOSITION

A vertical kettle mixer was charged with 353 g of a vinyl acetate-acrylic acid copolymer latex, 55% solids, (Covinax ®106 latex) and 17.6 g of the mixed dibenzoate of propylene and ethylene glycol (Benzoflex ®50) was added to the stirred latex. After 30 minutes of stirring at 25° C., 5.6 g of 37% formaldehyde was added, followed by 16 g of Nopco ® VF defoamer, 16 g of Colloids ®711 defoamer, and 8 g of a phenolic biocide (Cuniphen ®2778-I). After 10 minutes of slow mixing, 27.2 g of corn starch (Clinton Corn Products 121-B) was added and mixing continued another 0.5 hour. The resultant primer was screened (100 mesh) and exhibited a pH of 4.5 and a total solids content of 60%.

EXAMPLE IV

PRIMER COMPOSITIONS

Exs. I and II are repeated substituting an ethylene-vinyl acetate copolymer latex, 52.3% solids, (Elvace ®1875 latex) for the Airflex ®400 to yield primers IVA and IVB, respectively.

EXAMPLE V

CONTROL PRIMER COMPOSITIONS

A. Water (59 g) is stirred into 333 g of Airflex ®400 latex, followed by 4 g of Tergitol ®4 surfactant, 6.0 g of 37% formaldehyde and another 6.2 g water. The resultant primer exhibits a pH of 5.75 and a solids content of 47%.

B. Ex. VA is repeated substituting Elvace ®1875 for the Airflex ®400 latex.

C. Water (48 g) is stirred into 350 g of Airflex ®400 latex followed by 8 g of 37% formaldehyde and 1.2 g of Nopco ® VF defoamer. After 10 minutes of stirring, the resultant primer exhibits a pH of 5.5 and a total solids content of 46%.

D. Ex. VC is repeated, substituting Elvace ®1875 for Airflex ®400 latex.

E. Ex. III is repeated omitting the starch.

EXAMPLE VI

COMPARATIVE DRYING TESTS

Rectangular coatings (approximately 2″×10″) of the starch-containing primers of Exs. I-IV are applied to individual 7″×12″ tin-plated steel sheets to a thickness of about 20 mil with a doctor blade, and similarly-sized coatings of Control compositions A-E are streaked alongside the starch-containing coatings as indicated on Table I. The plates are sequentially placed under a four-lamp infrared drier (Model 5610, Research Inc., Minneapolis, MN). The wet coatings are dried by a thirty second exposure and the condition of the dried coating evaluated by visual observation.

TABLE I

| Starch Primer | Control Primer | Starch Primer-Film Condition | Control Primer-Film Condition |
|---|---|---|---|
| I | VC | Coherent, evenly cratered, slight browning | Broken and charred, large blisters |
| II | VA | Coherent, evenly cratered, slight browning | Broken and charred, large blisters |
| III | VE | Coherent, evenly cratered, slight browning | Broken and charred, large blisters |
| IVA | VD | Coherent, evenly cratered, slight browning | Broken and charred, large blisters |
| IVB | VB | Coherent, evenly cratered, slight browning | Broken and charred, large blisters |

The data summarized on Table I indicates that the addition of unswollen corn starch to water-based primer compositions based on a variety of plasticized and unplasticized latexes effectively prevents blistering of the primer coatings and the charring and coating loss which occurs when the blisters break and burn during high temperature drying. The starch-treated primers all dried to firmly-adhered, evenly-roughened films.

Visual observation indicates that the roughening (cratering) effect is due to the rapid formation of a multiplicity of small bubbles in the coating film which immediately break to dehydrate the coating, rather than combining into a single large blister.

The substitution of wheat or maize starch for the corn starch in the compositions of Exs. I-IV also affords satisfactory results in this test.

EXAMPLE VII
BOOK BINDING

Book blocks (8"w×12"l×0.5"h) composed of sheets of 45 lb. heavily-coated, ground wood sulfite stock were fed through a Sheradin binding machine at a rate of about 60-80 blocks/minute. The spines were sequentially roughened, trimmed and coated with 6 mil (150 microns) of the primer of Example I. The blocks were then passed through three 92 inch-long propane-fueled drying ovens and coated with H. B. Fuller Co. HM-1922 hot-melt adhesive at a hot-melt temperature of 350°-375° F. No splattering of the adhesive occurred during application of the hot-melt coating. The blocks were then covered, clamped in groups of four and trimmed. The finished glued-off books were trimmed with no smearing or blocking.

Primer-coated blocks removed from the conveyor after this intense drying exhibited fully-dried, coherent coatings with evenly-pitted surfaces. Between 70-80 pounds of force were required to pull out individual sheets which also could be flexed more than 1300 times without separation from the spine. A page pull of greater than 40 pounds and a flex of greater than 500 times is considered normal, satisfactory performance for dried, primed blocks of this paper type.

EXAMPLE VIII
BOOK BINDING

The binding process of Example VI was carried out employing 5.5"w×8.5"l×0.75"h blocks composed of sheets of 28 pounds bible stock, with equally satisfactory results with respect to the dried primer and the hot-melt coating. Individual sheets pulled out at about 38-42 pounds and could be flexed more than 1300 times before separation. A page pull of greater than 28 pounds and a flex of greater than 500 times is considered normal, satisfactory performance for this stock after priming.

Use of the untreated control primer of Examle VC in binding runs carried out with the blocks of Exs. VII--VIII resulted in severe blistering, charring and breaking of the primer layer.

Table II summarizes additional runs carried out according to the procedures of Ex. VII, using the primer of Ex. I, and a number of different stocks and hot-melts. In all cases, the dried primer coating was unbroken, flexible and evenly pitted. Even application of the hot-melt layer was achieved without splattering. The individual block sheets exhibited at least satisfactory performance in the page pull and page flex tests.

TABLE II

| | Book Binding | | |
|---|---|---|---|
| Example | Total Oven Length | Hot-Melt* | Page Stock |
| IX | 23 feet | HM 3415 | Coated (Ex. VII) |
| X | 23 feet | HM 3415 | Bible (Ex. VIII) |
| XI | 7.6 feet | HM 1330 | 52 lb. Vellum-uncoated |
| XII | 15 feet | HM 3415 | 52 lb. Vellum-uncoated |

*H. B. Fuller Co. designations.

EXAMPLE XIII
BOOK BINDING

Two 0.75 inch-wide book blocks were clamped together, fed into a Cameron binding press and coated with the primer of Ex. III. Use of the maximum oven heating dried the primer coating without blistering. Hot-melt application was also satisfactory. Use of wheat starch in place of corn starch in the primer of Ex. III in a similarly-conducted run also afforded satisfactory results. Use of the Control Primer of Example VE, on the other hand, led to extensive blistering and charring of the primer film during the oven drying.

The invention has been described with reference to various specific and preferred embodiments and techniques. However, it should be understood that many variations and modifications may be made while remaining within the spirit and scope of the invention.

What is claimed is:

1. A continuous book binding process comprising:
   forming a book block having a spine area;
   coating the spine area with a primer composition comprising an adhesive latex and an amount of ungelatinized granular starch effective to complex a major portion of the latex water so that the water is evaporated in a diffuse controlled manner during the subsequent drying step;
   thermally drying said coating to evaporate a substantial amount of said water and to form a flexible primer film having a uniformly irregular surface;
   applying a layer of a liquid hot-melt covering adhesive to said flexible film at a temperature of about 150°-200° C., wherein the residual water released from said primer film by said applying does not disturb the integrity of said covering adhesive layer; and
   cooling said covering adhesive layer to a tacky, coherent film.

2. The process of claim 1 wherein the starch comprises about 1-20% by weight of the primer composition.

3. The process of claim 2 wherein the composition comprises an amount of starch effective to complex substantially all of the latex water.

4. The process of claim 3 wherein the starch comprises about 3-10% of a starch selected from the group consisting of corn, potato, wheat, rice, waxy maize, sago, sorghum, arrowroot, tapioca and mixtures thereof.

5. The process of claim 4 wherein the adhesive latex comprises about 50-97% of the primer composition.

6. The process of claim 5 wherein the primer composition comprises about 30-80% total solids.

7. The process of claim 5 wherein the adhesive latex comprises particles of a polymeric resin selected from the group consisting of polychloroprene, styrene-butadiene rubber, vinylidene chloride, ethylene-vinyl chloride copolymers, ethylene-vinyl acetate copolymers, vinyl acetateacrylic acid copolymers and acrylonitrite-butadiene copolymers.

8. The process of claim 7 wherein the resin is an ethylene-vinyl acetate copolymer.

9. The process of claim 1 wherein the wet primer coating is about 2-35 mils thick.

10. The process of claim 1 wherein the thermal drying is carried out by exposure of the wet primer coating to a temperature of about 150°-200° C.

11. The process of claim 3 wherein the primer composition comprises about 0.05-2.5% of a biocide.

12. The process of claim 3 wherein the primer composition comprises about 0.05-2% of a foam control agent.

13. The process of claim 3 wherein the primer composition comprises about 1-10% of a plasticizer.

14. A book comprising a spine area coated by the binding process of claim 1.

* * * * *

UNITED STATES PATENT AND TRADEMARK OFFICE
CERTIFICATE OF CORRECTION

PATENT NO.   : 4,536,012
DATED        : August 20, 1985
INVENTOR(S)  : Robert M. Hume, III It is certified that error appears in the above-identified patent and that said Letters Patent is hereby corrected as shown below:

At Column 2, lines 57-58, for "referred" read --preferred--.

At Column 6, line 2, for "primary" read --primer--.

At Column 6, line 21, for "membrance" read --membrane--.

At Column 6, line 52, delete "a".

At Column 9, line 39, for "Examle" read --Example--.

At Column 10, line 51, for "acetateacrylic" read --acetate-acrylic--.

Signed and Sealed this

Twenty-sixth Day of November 1985

[SEAL]

Attest:

Attesting Officer

DONALD J. QUIGG

Commissioner of Patents and Trademarks